United States Patent
LeFevre et al.

(10) Patent No.: US 10,350,825 B2
(45) Date of Patent: Jul. 16, 2019

(54) METHOD AND APPARATUS FOR FORMING AN IMAGE ONTO AN OBJECT USING SELECTIVE LASER SINTERING

(71) Applicant: Xerox Corporation, Norwalk, CT (US)

(72) Inventors: Jason M. LeFevre, Penfield, NY (US); Steven M. Russel, Bloomfield, NY (US); Timothy P. Foley, Marion, NY (US)

(*) Notice: Subject to any disclaimer, the term of this patent is extended or adjusted under 35 U.S.C. 154(b) by 562 days.

(21) Appl. No.: 15/065,398

(22) Filed: Mar. 9, 2016

(65) Prior Publication Data
US 2017/0259503 A1    Sep. 14, 2017

(51) Int. Cl.
| | |
|---|---|
| *B29C 64/188* | (2017.01) |
| *B29C 64/176* | (2017.01) |
| *B29C 64/153* | (2017.01) |
| *B29C 64/171* | (2017.01) |
| *B29C 64/194* | (2017.01) |
| *B33Y 10/00* | (2015.01) |
| *B33Y 99/00* | (2015.01) |

(52) U.S. Cl.
CPC ......... *B29C 64/188* (2017.08); *B29C 64/153* (2017.08); *B29C 64/171* (2017.08); *B29C 64/176* (2017.08); *B29C 64/194* (2017.08); *B33Y 10/00* (2014.12); *B33Y 99/00* (2014.12)

(58) Field of Classification Search
CPC ... B29C 64/188; B29C 64/176; B29C 64/171; B29C 64/194; B29C 64/153; B33Y 10/00
See application file for complete search history.

(56) References Cited

U.S. PATENT DOCUMENTS

| | | | | |
|---|---|---|---|---|
| 5,460,758 | A * | 10/1995 | Langer | G03F 7/0037 118/429 |
| 2009/0152771 | A1* | 6/2009 | Philippi | B33Y 10/00 264/410 |
| 2011/0190904 | A1* | 8/2011 | Lechmann | A61B 17/7208 623/23.61 |
| 2015/0130117 | A1* | 5/2015 | Lacaze | B29C 70/681 264/482 |
| 2015/0170007 | A1* | 6/2015 | Cudak | G06K 15/1809 358/1.15 |
| 2016/0332371 | A1* | 11/2016 | Staroselsky | B29C 67/0077 |
| 2016/0339639 | A1* | 11/2016 | Chivel | B33Y 10/00 |

* cited by examiner

*Primary Examiner* — Christopher D Rodee

(57) ABSTRACT

A method, non-transitory computer readable medium and apparatus for forming an image on a three dimensional (3D) object are disclosed. For example, the method includes, detecting the 3D object that is formed from a first material is positioned on a movable bed, providing a bed of a powder of a second material on the movable bed around the 3D object, vibrating the bed of powder to provide a level surface of the powder, sintering a portion of the bed of the powder onto the 3D object, moving the 3D object and repeating the providing, the vibrating, the sintering and the moving to form the image onto the 3D object.

7 Claims, 6 Drawing Sheets

METHOD AND APPARATUS FOR FORMING AN IMAGE ONTO AN OBJECT USING SELECTIVE LASER SINTERING

The present disclosure relates generally to printing and, more particularly, to a method and apparatus for forming an image onto an object using selective laser sintering.

BACKGROUND

Three dimensional (3D) printers are becoming more ubiquitous. 3D printers are typically used to create three dimensional objects from a particular material.

In addition, printing on 3D objects is challenging. 3D objects can pose many obstacles not previously encountered in conventional sense of image formation and printing. Some of these challenges may include jetting across large and varying gaps, object detection, image to object registration and object holding to name a few challenges.

Typical ink-jet printing based solution for 3D objects may also present a challenge. Ink-jet print heads may require small gaps (e.g., approximately 1-4 millimeters (mm)) between the face of the ink-jet print head and the object. Sometimes, this may not be possible because of the topography of a 3D object. For example, 3D objects may have deep recesses that a print head simply cannot access and maintain a proper gap.

SUMMARY

According to aspects illustrated herein, there are provided a method, a non-transitory computer readable medium, and an apparatus for forming an image on a three dimensional (3D) object. One disclosed feature of the embodiments is a method that detects the 3D object that is formed from a first material is positioned on a movable bed, provides a bed of a powder of a second material on the movable bed around the 3D object, vibrates the bed of powder to provide a level surface of the powder, sinters a portion of the bed of the powder onto the 3D object, moves the 3D object and repeats the providing, the vibrating, the sintering and the moving to form the image onto the 3D object.

Another disclosed feature of the embodiments is a non-transitory computer-readable medium having stored thereon a plurality of instructions, the plurality of instructions including instructions which, when executed by a processor, cause the processor to perform operations that detect the 3D object that is formed from a first material is positioned on a movable bed, provide a bed of a powder of a second material on the movable bed around the 3D object, vibrate the bed of powder to provide a level surface of the powder, sinters a portion of the bed of the powder onto the 3D object, move the 3D object and repeat the providing, the vibrating, the sintering and the moving to form the image onto the 3D object.

Another disclosed feature of the embodiments is an apparatus comprising a processor and a computer readable medium storing a plurality of instructions which, when executed by the processor, cause the processor to perform operations that detect the 3D object that is formed from a first material is positioned on a movable bed, provide a bed of a powder of a second material on the movable bed around the 3D object, vibrate the bed of powder to provide a level surface of the powder, sinters a portion of the bed of the powder onto the 3D object, move the 3D object and repeat the providing, the vibrating, the sintering and the moving to form the image onto the 3D object.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for forming an image on a three dimensional (3D) object. As discussed above, printing on 3D objects is challenging. 3D objects can pose many obstacles not previously encountered in conventional sense of image formation and printing. Some of these challenges may include jetting across large and varying gaps, object detection, image to object registration and object holding to name a few challenges.

Typical ink-jet printing based solution for 3D objects may also present a challenge. Ink-jet print heads may require small gaps (e.g., approximately 1-4 millimeters (mm)) between the face of the ink-jet print head and the object. Sometimes, this may not be possible because of the topography of a 3D object. For example, 3D objects may have deep recesses that a print head simply cannot access and maintain a proper gap.

Embodiments of the present disclosure provide an apparatus that uses some elements common to the selective laser sintering (SLS) process to print an image (or add material) onto a 3D object. In one embodiment, the 3D object may be placed in an apparatus and the small particles of powder may be fused onto the 3D object to print, or form, the image.

Figure 1:
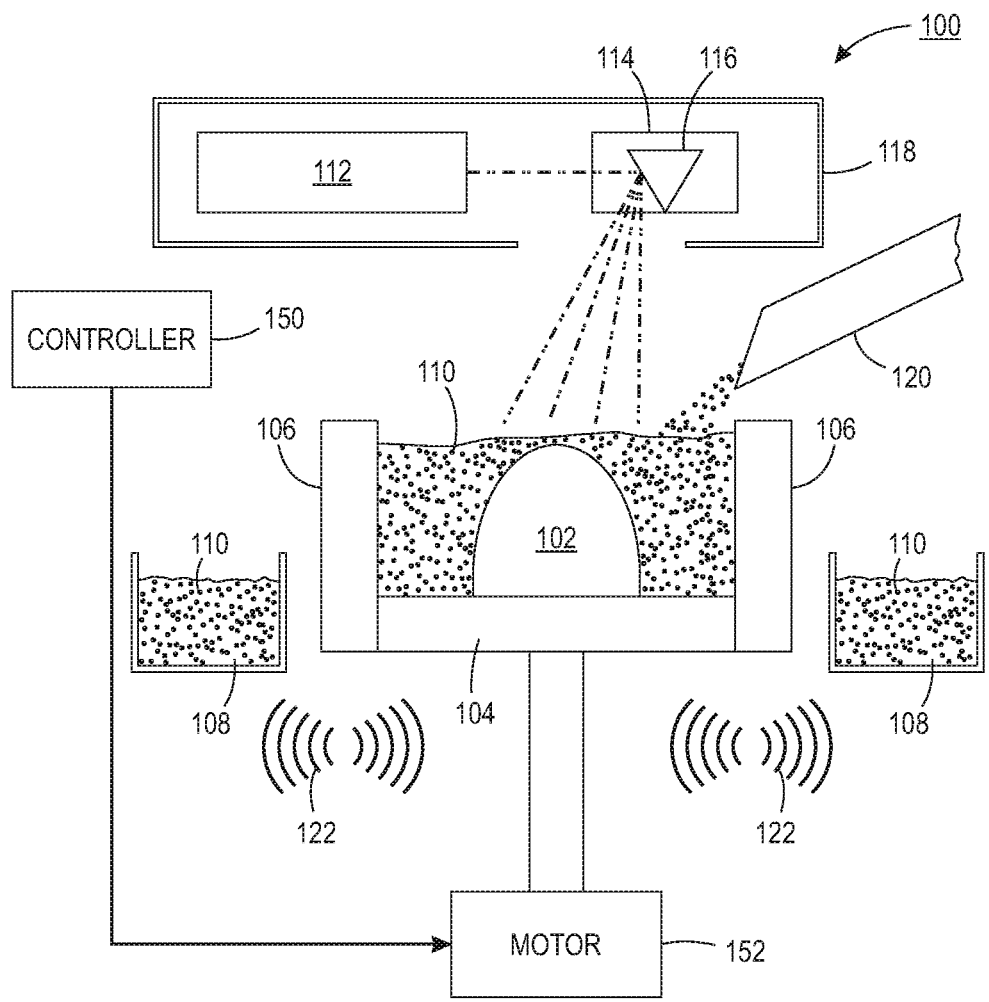
FIG. 1 illustrates a cross-sectional block diagram of an example apparatus of the present disclosure.

FIG. 1 illustrates a cross-sectional view of an example apparatus 100 of the present disclosure. In one embodiment, the apparatus 100 may include a movable bed 104, a wall 106, an outer tray 108, and a high powered laser 112. In one embodiment, the movable bed 104 may have a level platform that can move vertically up or down (e.g., closer to the laser 112 or farther away from the laser 112).

In one embodiment, a 3D object 102 may be placed onto the movable bed 104. The 3D object 102 may be fabricated from a first material. The 3D object 102 may have been fabricated, produced, or formed in a previous process. In other words, the 3D object 102 is not formed using the apparatus 100 at the same time the image is being formed.

In one embodiment, a powder chute 120 may provide a powder 110 into a volume formed between the wall 106 and the movable bed 104. In one embodiment, the powder 110 may cover the 3D object 102. In another embodiment, the powder 110 may be dispensed to form a first layer at a bottom portion, or a base, of the 3D object 102. How the powder 110 is dispensed may depend on how the image is formed as will be discussed below.

It should be noted that the powder chute 120 may be optional. For example, the powder 110 may be manually added between iterations. In addition, the powder chute 120 may be located anywhere around the wall 106 as long as the powder 110 may be dispensed over the wall 106 and onto the movable bed 104.

In one embodiment, the powder 110 may comprise particles having an average diameter of 10-100 microns. The powder 110 may be any type of material that is compatible for bonding (e.g., a chemical bond, a thermal bond, and the like) to the first material of the 3D object 102. The powder 110 may be a plastic, a metal, a ceramic, a glass powder, and the like.

In one embodiment, the first material of the 3D object 102 and the second material may be the same. For example, the 3D object 102 may be a plastic or polymer. The same material may presumably be compatible for bonding to the 3D object 102.

In another embodiment, the first material of the 3D object 102 and the second material may be different. For example, the powder 110 may comprise small particles of a second material that is different than the first material of the 3D object 102. Laser welding material compatibility charts are widely available and can be used to determine what type of second material to use based on the first material of the 3D object 102.

In another embodiment, the first material of the 3D object 102 may be a type of material that allows for a mechanical bond to the second material. For example, if the first material is a fabric, the second material may be any type of plastic or polymer that can melt and reform by attaching to the fibers of the fabric.

In one embodiment, the powder 110 may be pre-heated to a temperature that is just under the melting point of the material that is used as the powder 110. Pre-heating the powder 110 may allow the energy applied by the high powered laser 112 to be more efficient or effective in sintering the portions of the powder 110 to the 3D object 102 to form the image.

In one embodiment, the movable bed 104 and the wall 106 may be vibrated as shown by lines 122 via any mechanical means. For example, the vibration may be applied by one or more pistons, by shaking the apparatus 100, and the like. The vibration 122 may provide a level surface of the powder 110. Excess powder 110 may vibrate over the wall 106 and into the outer tray 108. The outer tray 108 may be emptied and the excess powder 110 may be recycled. For example, the outer tray 108 may have a bottom portion of the outer tray 108 removed to allow the excess powder 110 to fall into a collection basket, or some other similar mechanism.

In one embodiment, the outer tray 108 may have a shape that is similar to the shape of the wall 106 and the movable bed 104. For example, the outer tray 108 may be concentric to the wall 106 and the movable bed 104.

Figure 2:
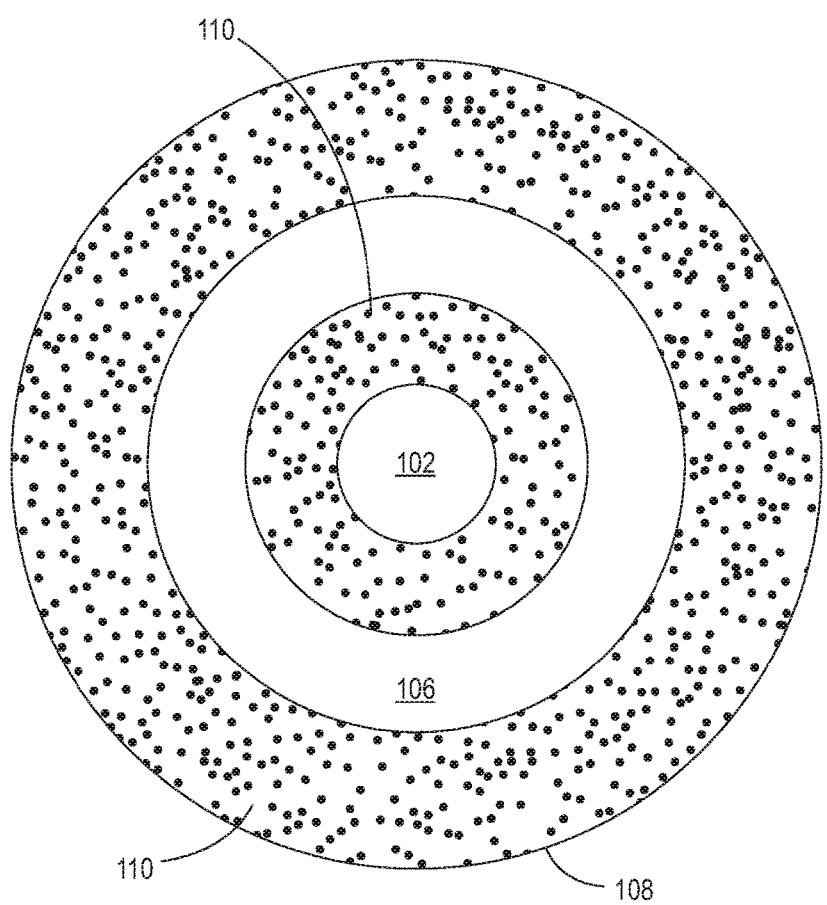
FIG. 2 illustrates a top view of the example apparatus of the present disclosure.

FIG. 2 illustrates a top view of the apparatus 100 that illustrates the outer tray 108 relative to the wall 106 and the movable bed 104. In one embodiment, if the movable bed 104 and the wall 106 are circular, the outer tray 108 may have a similar circular shape that surrounds the wall 106.

Although the movable bed 104, the wall 106 and the outer tray 108 are shown as being circular in FIG. 2, it should be noted that the movable bed 104, the wall 106 and the outer tray 108 may be any shape. For example, the movable bed 104 and the wall 106 may be a square shape and the outer tray 108 may have a similar square shape that surrounds the wall 106.

The outer tray 108 may be located against, or in contact with, the wall 106. In another embodiment, the outer tray 108 may be positioned slightly away from the wall 106.

Referring back to FIG. 1, the high powered laser 112 may be a carbon dioxide laser. The high powered laser 112 may be coupled to an x-y stage 118 that allows a scanner 114 to be moved along an x-y coordinate system. In one embodiment, the scanner 114 may be moved left and right, or into and out of the page, in FIG. 1. The scanner 114 may be used to scan portions of the powder 110 and the 3D object 102 that are to receive the powder 110 to form an image. In one embodiment, a prism 116 may also be included in the scanner 114 to allow energy emitted by the high powered laser 112 to be aimed at selective portions of the powder 110. In one embodiment, the scanner 114 may be used to detect that the 3D object 102 has been placed on the movable bed 104.

In one embodiment, the high powered laser 112 may be manipulated or controlled using other mechanical means. For example, the high powered laser 112 may be positioned onto a gimbal that can aim the laser 112 in any direction.

In one embodiment, the apparatus 100 may include a controller 150 that may coordinate, or control, the process for forming the image onto the 3D object 102 by controlling dispensing of the powder 110, movement of the movable bed 104 and the energy applied by the high powered laser 112. In one embodiment, the controller 150 may be in communication with a motor 152 coupled to the movable bed 104, the powder chute 120, the high powered laser 112, the scanner 114 and the x-y stage 118.

In one embodiment, the controller 150 may receive a mapping of the 3D object 102 and an image that is to be formed onto the 3D object 102. For example, the mapping may be received from a digital design program or a computer aided design (CAD) software program. In one embodiment, the image may be text, a design, a logo, a graphic, a picture, and the like.

Figure 3:
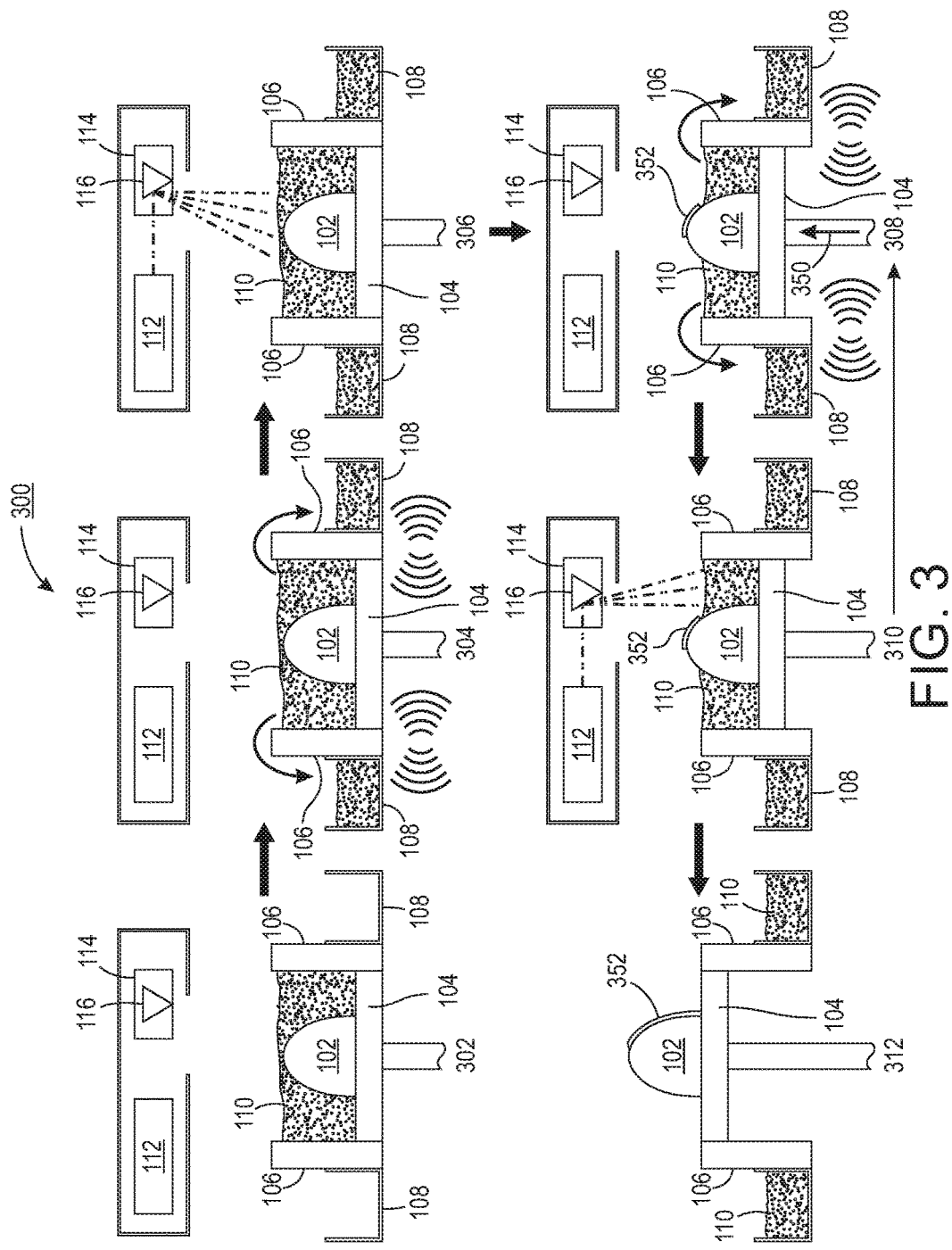
FIG. 3 illustrates a process flow block diagram of an example method for forming an image on a 3D object.
Figure 4:
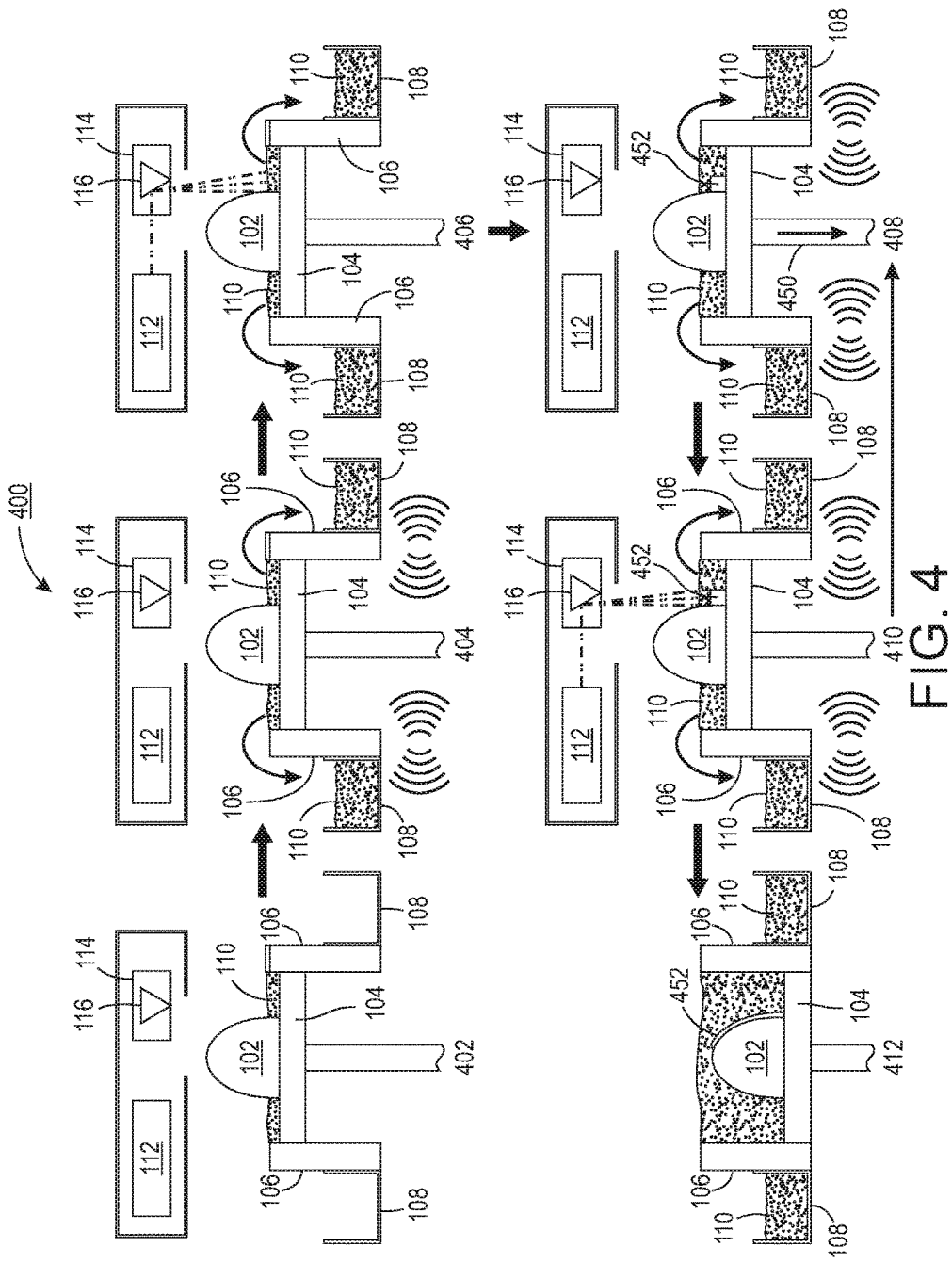
FIG. 4 illustrates a process flow block diagram of another example method for forming an image on a 3D object.

FIGS. 3 and 4 illustrate two different examples of how an image 352 and 452, respectively, can be formed onto the 3D object 102. FIG. 3 illustrates a method 300 that begins with the 3D object 102 buried under the powder 110 and the image 352 is printed from top to bottom as the movable bed 104 is moved incrementally higher towards the high powered laser 112.

The method 300 begins at block 302. At block 302, the 3D object 102 is placed on the movable bed 104 that is positioned at a lowest position below a top of the wall 106. The powder 110 is dispensed onto the movable bed 104 and around the 3D object 102 until the 3D object 102 is buried under the powder 110. In one example, powder 110 may be dispensed until a layer of a predefined thickness (e.g., a few microns) has covered the top most part of the 3D object 102. As discussed above, in one embodiment, the powder 110 may be heated to a temperature just below a melting point temperature of the powder 110.

At block 304, the movable bed 104 and/or the wall 106 may be vibrated to provide a level surface of the powder 110. The excess powder 110 may shake out and over the wall 106 into the outer tray 108. After the vibrations cause the excess powder 110 to shake out and over the wall 106, the top level surface of the powder 110 and the top surface of the wall 106 may be approximately co-planar. In other words, the top level of the wall 106 and the top level surface of the powder 110 may be even or on the same plane.

At block 306, the scanner 114 may scan the portion of the powder 110 that is to be sintered onto the 3D object 102. The prism 116 may be positioned such that the laser, or energy, emitted by the high powered laser 112 may be directed towards the portion of the powder 110 that was scanned by the scanner 114. The high powered laser 112 may then emit the laser and sinter those portions on the top layer of the powder 110 that were scanned.

At block 308, the movable bed 104 may be moved upwards by a predefined amount. In one example, the predefined amount may be a function of a thickness of the layer of powder 110 that was sintered (e.g., 1 to 100 microns depending on the density of the material used as the powder 110). The movement of the movable bed 104 raises the 3D object 102 above a "shoreline" of the layer of powder 110. As a result, the portion of the image 352 that has been formed may be moved above the "shoreline" as well.

The movable bed 104 and/or the wall 106 may be vibrated again to provide a level surface of the powder 110. The excess powder 110 may shake out and over the wall 106 into the outer tray 108.

At block 310, the scanner 114 may scan the portion of the powder 110 that is to be sintered onto the 3D object 102. The prism 116 may be positioned such that the laser, or energy, emitted by the high powered laser 112 may be directed towards the portion of the powder 110 that was scanned by the scanner 114. The high powered laser 112 may then emit the laser and sinter those portions on the top most layer of the powder 110 that were scanned.

In one embodiment, the dispensing of the powder 110, the vibration of the bed of powder 110, the sintering and the moving of the 3D object 102 upwards may be repeated until the formation of the image 352 is completed. For example, the method 300 may cycle between blocks 308 and 310 as each layer of the image 352 is formed onto the 3D object 102.

At block 312, after the final sintering of the powder 110, the 3D object 102 may be raised to a top most position. The remaining powder 110 may be removed into the outer tray 108. In some embodiments, additional cleaning or rinsing steps may be deployed to remove un-sintered powder from the image 352 that is formed onto the 3D object 102. At block 312 the method 300 may be completed.

In one embodiment, different types and/or colors of powder 110 may be dispensed at block 302. For example, depending on the color of different portions of the image 352, the corresponding color powder 110 may be dispensed at the appropriate layers (e.g., different colors of powder 110 at different depths). In another embodiment, the entire process 300 may be repeated for different colors. For example, the first run of the process 300 may be to form a base of the image 352 of a one color. Then a different colored powder 110 may be dispensed at block 302 for a second run of the process 300 and the process 300 may be repeated. Then a third different colored powder 110 may be dispensed at block 302 for a third run of the process 300, and so forth. As a result, the different colored layers of the image 352 may be formed by separate runs of the process 300.

FIG. 4 illustrates an example method 400 that begins with the 3D object 102 that begins with a predefined layer of the powder 110 around a base, or bottom, of the 3D object. Then the image 452 is printed from bottom to top as the movable bed 104 is moved incrementally lower away from the high powered laser 112.

The method 400 begins at block 402. At block 402, the 3D object 102 is placed on the movable bed 104 that is positioned in a higher position or top most position just below a top of the wall 106. The powder 110 is dispensed (e.g., via the powder chute 120 show in FIG. 1) onto the movable bed 104 and around the 3D object 102. In one example, powder 110 may be dispensed until a layer of a predefined thickness (e.g., a few microns) is placed around the base or bottom of the 3D object 102. As discussed above, in one embodiment, the powder 110 may be heated to a temperature just below a melting point temperature of the powder 110.

At block 404, the movable bed 104 and/or the wall 106 may be vibrated to provide a level surface of the powder 110. The excess powder 110 may shake out and over the wall 106 into the outer tray 108.

At block 406, the scanner 116 may scan the portion of the powder 110 that is to be sintered onto the 3D object 102. The prism 116 may be positioned such that the laser, or energy, emitted by the high powered laser 112 may be directed towards the portion of the powder 110 that was scanned by the scanner 114. The high powered laser 112 may then emit the laser and sinter those portions on the top layer of the powder 110 that were scanned.

At block 408, the movable bed 104 may be moved downward by a predefined amount. In one example, the predefined amount may be a function of a thickness of the layer of powder 110 that was sintered (e.g., 1 to 100 microns depending on the density of the material used as the powder 110). The movement of the movable bed 104 lowers the 3D object 102 below a "shoreline" of the layer of powder 110. As a result, the portion of the image 452 that has been formed may be moved below the "shoreline" as well by an amount that ensures that additional powder 110 will not be sintered on to the image 452 that is already formed.

After the movable bed 104 has been moved downward, additional powder 110 may be dispensed onto the movable bed 104. In one embodiment, the additional powder 110 may be the same as the previous layer of powder 110 that was dispensed. In another embodiment, the additional powder 110 may be a different color and/or type of material than the previously layer of powder 110 that was dispensed.

The movable bed 104 and/or the wall 106 may be vibrated again to provide a level surface of the powder 110. The excess powder 110 may shake out and over the wall 106 into the outer tray 108.

At block 410, the scanner 114 may scan the portion of the powder 110 that is to be sintered onto the 3D object 102. The prism 116 may be positioned such that the laser, or energy, emitted by the high powered laser 112 may be directed towards the portion of the powder 110 that was scanned by the scanner 114. The high powered laser 112 may then emit the laser and sinter those portions on the top most layer of the powder 110 that were scanned.

In one embodiment, the dispensing of the powder 110, the vibration of the bed of powder 110, the sintering and the moving of the 3D object 102 downward may be repeated until the formation of the image 452 is completed. For example, the method 400 may cycle between blocks 408 and 410 as each layer of the image 452 is formed onto the 3D object 102.

At block 412, after the final sintering of the powder 110, the 3D object 102 may be completed at a bottom most position of the movable bed 104. In one embodiment, the movable bed 104 may be raised to a top most position to remove the remaining powder 110 into the outer tray 108. In some embodiments, additional cleaning or rinsing steps may be deployed to remove un-sintered powder from the image 452 that is formed onto the 3D object 102. At block 412 the method 400 may be completed.

Figure 5:
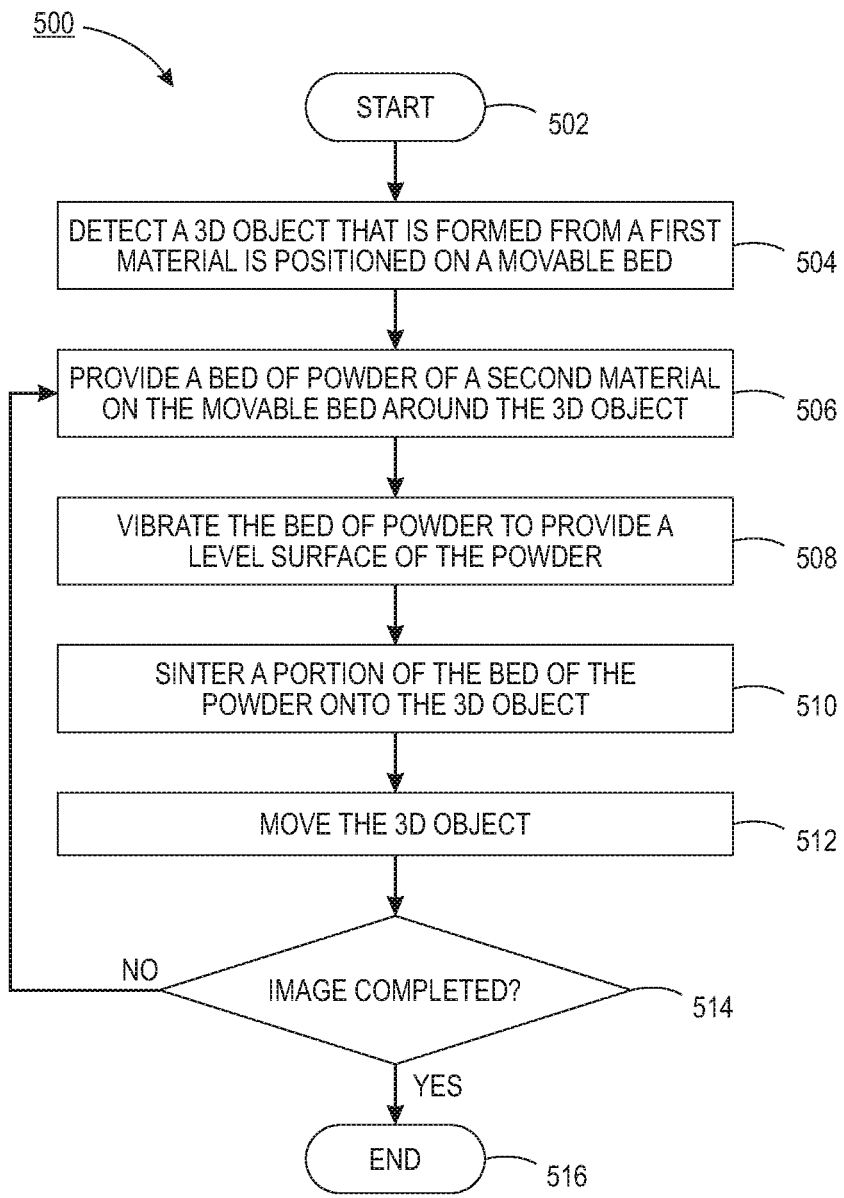
FIG. 5 illustrates a flowchart of an example method for forming an image on a three dimensional (3D) object.
Figure 6:
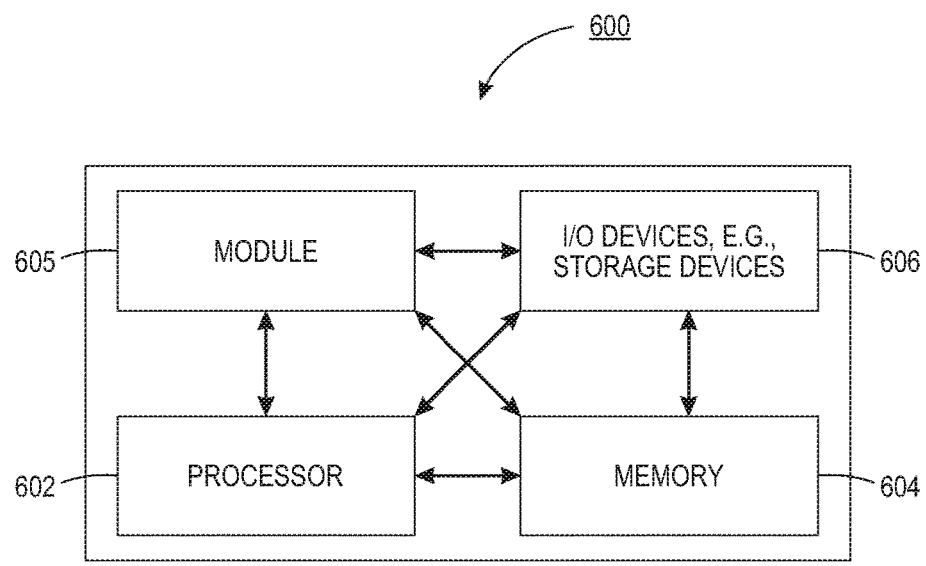
FIG. 6 illustrates a high-level block diagram of a computer suitable for use in performing the functions described herein.

In another embodiment, the entire process 400 may be repeated for different colors. For example, the first run of the process 400 may be to form a base of the image 452 of a one color. Then a different colored powder 110 may be dispensed at blocks 402 and 408 for a second run of the process 400 and the process 400 may be repeated. Then, a third different colored powder 110 may be dispensed at blocks 402 and 408 for a third run of the process 400, and so forth. As a result, the different colored layers of the image 452 may be formed by separate runs of the process 400. FIG. 5 illustrates a flowchart of an example method 500 for forming an image on a 3D object. In one embodiment, one or more steps or operations of the method 500 may be performed by the apparatus 100 (e.g., the controller 150) and/or a computer as illustrated in FIG. 6 and discussed below.

At block 502, the method 500 begins. At block 504, the method 500 detects a 3D object that is formed from a first material is positioned on a movable bed. For example, the 3D object may be previously formed using the first material in a previous 3D printing process or any fabrication process. The first material may be any type of material, such as, a plastic, a polymer, a ceramic, glass, a fabric, a metal, and the like.

In one embodiment, the 3D object may be automatically detected by a scanner, a sensor on the movable bed, or any other type of sensor, that can send a signal to the controller when the presence of the 3D object is detected. In another embodiment, an operator may provide a signal (e.g., press a button on the apparatus, press a button on an external computer, and the like) after the 3D object is placed on the movable bed.

At block 506, the method provides a bed of powder of a second material on the movable bed around the 3D object. In one example, "around the 3D object" may be defined as being all around, or burying, the 3D object under the bed of powder when the image is formed from top to bottom (e.g., see FIG. 3). In another example, "around the 3D object" may be defined as dispensing a layer of the powder around a bottom portion, or a base, of the 3D object when the image is formed from bottom to top (e.g., see FIG. 4).

In one embodiment, the second material may be the same as the first material. Notably, the same materials are usually compatible for thermal bonding. In another embodiment, the second material may be different than the first material. The second material may be a different material that is compatible for thermal bonding with the first material. For example, laser welding material compatibility charts are widely available and can be used to determine what type of second material can be used based on the first material of the 3D object.

In another embodiment, the first material of the 3D object may be a type of material that allows for a mechanical bond to the second material. For example, if the first material is a fabric, the second material may be any type of plastic or polymer that can melt and reform by attaching to the fibers of the fabric.

At block 508, the method 500 may vibrate the bed of powder to provide a level surface of the powder. For example, the movable bed and/or the wall around the movable bed may be vibrated by a mechanical means. For example, one or more pistons may be deployed, the entire apparatus may shake from side to side, and the like. As the powder is vibrated the excess powder may be removed into an outer tray that surrounds the movable bed and the wall. The excess powder may fall over the wall and into the outer tray. The powder remaining inside of the walls and on the movable bed may settle to form a level, even, or smooth surface of powder.

At block 510, the method 500 may sinter a portion of the bed of the powder onto the 3D object. For example, a scanner may scan a portion of the powder that is to be sintered onto the 3D object. A prism may be positioned such that the laser, or energy, emitted by the laser may be directed towards the portion, or portions, of the top layer of powder that was scanned.

At block 512, the method 500 may move the 3D object. For example, if the image is being formed from top to bottom on the 3D object, then the 3D object may be moved by raising the movable bed. In other words, the movable bed may be moved upward toward from the laser by a predefined amount.

In another example, if the image is being formed from bottom to top on the 3D object, then the 3D object may be moved by lowering the movable bed. In other words, the movable bed may be moved downward away from the laser by a predefined amount. As discussed above, the predefined amount may be a function of a thickness of the layer of powder that was sintered (e.g., 1 to 100 microns depending on the density of the material used as the powder).

At block 514, the method 500 determines if the formation of the image is completed. In other words, the method 500 determines if the printing of the image using SLS is completed. If the image formation has not completed, then the method 500 may return to block 506 and blocks 506, 508, 510 and 512 may be repeated.

However, if the image formation has completed, then the method 500 may proceed to block 516. At block 516, the method 500 ends.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 5 that recite a determining operation, or involve a decision, do not necessarily require that both branches of the determining operation be practiced. In other words, one of the branches of the determining operation can be deemed as an optional step.

FIG. 6 depicts a high-level block diagram of a computer that can be transformed to into a machine that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for forming an image on a 3D object, and various input/output devices 606 (e.g., storage devices, including but not limited to, a tape drive, a floppy drive, a hard disc drive or a compact disc drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for forming an image on a 3D object (e.g., a software program comprising computer-executable instructions) can be loaded into memory 604 and executed by hardware processor element 602 to implement the steps, functions or operations as discussed above in connection with the exemplary methods 300, 400 and 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for forming an image on a 3D object (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for forming an image on a three dimensional (3D) object, comprising:
    detecting the 3D object that is formed from a first material is positioned on a movable bed, wherein the first material comprises a fabric;
    providing a bed of a powder of a second material on the movable bed around the 3D object, wherein the second material a plastic;
    vibrating the bed of powder to provide a level surface of the powder;
    sintering a portion of the bed of the powder onto the 3D object, wherein the plastic forms a mechanical bond with the fabric by melting from the sintering and reforming by attaching to fibers of the fabric;
    moving the 3D object; and
    repeating the providing, the vibrating, the sintering and the moving to form the image onto the 3D object.

2. The method of claim 1, wherein the movable bed comprises a circular bed.

3. The method of claim 2, wherein the vibrating causes excess powder to fall into a ring shaped tray around the circular bed.

4. The method of claim 1, wherein the providing comprises burying the 3D object under the bed of powder.

5. The method of claim 4, wherein the moving comprises moving the 3D object up via the movable bed by a predefined amount.

6. The method of claim 1, wherein the providing comprises a layer around a bottom portion of the 3D object.

7. The method of claim 6, wherein the moving comprises moving the 3D object down via the movable bed by a predefined amount.

* * * * *